United States Patent
Xia et al.

(10) Patent No.: US 9,791,334 B2
(45) Date of Patent: Oct. 17, 2017

(54) POLYMER COMPOSITE WIRELINE CABLES COMPRISING OPTICAL FIBER SENSORS

(71) Applicant: Halliburton Energy Services, Inc., Houston, TX (US)

(72) Inventors: Hua Xia, Huffman, TX (US); Sean Gregory Thomas, Frisco, TX (US); David L. Perkins, The Woodlands, TX (US); John L. Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 79 days.

(21) Appl. No.: 14/771,249

(22) PCT Filed: Apr. 28, 2015

(86) PCT No.: PCT/US2015/027904
§ 371 (c)(1),
(2) Date: Aug. 28, 2015

(87) PCT Pub. No.: WO2015/175202
PCT Pub. Date: Nov. 19, 2015

(65) Prior Publication Data
US 2016/0363493 A1    Dec. 15, 2016

Related U.S. Application Data

(60) Provisional application No. 61/994,296, filed on May 16, 2014.

(51) Int. Cl.
*E21B 47/00* (2012.01)
*G01L 1/24* (2006.01)
(Continued)

(52) U.S. Cl.
CPC ............... *G01L 1/246* (2013.01); *C08K 7/02* (2013.01); *C08L 101/00* (2013.01); *D07B 1/145* (2013.01);
(Continued)

(58) Field of Classification Search
CPC ... E21B 47/0006; E21B 47/123; E21B 17/206
See application file for complete search history.

(56) References Cited

U.S. PATENT DOCUMENTS 5,894,104 A    4/1999  Hedberg
6,004,639 A *  12/1999  Quigley ............... B29C 70/086
                                                    138/125
(Continued)

FOREIGN PATENT DOCUMENTS

CA    2244829 A1 *  3/1999  ............ E21B 47/00
WO    2015175202 A1   11/2015

OTHER PUBLICATIONS

Pearce et al., Real-Time Compaction Monitoring with Fiber-Optic Distributed Strain Sensing (DSS). SPWLA 50th Annual Logging Symposium, Society of Petrophysicists and Well-Log Analysts, 2009, pp. 1-11.
(Continued)

*Primary Examiner* — Robert E Fuller
*Assistant Examiner* — David Carroll
(74) *Attorney, Agent, or Firm* — McDermott Will & Emery LLP (57) ABSTRACT

A polymer composite wireline cable comprising: a polymeric matrix material; at least one reinforced fiber embedded in the polymeric matrix material; and at least one optical fiber disposed in the polymeric matrix material, the at least one optical fiber having at least one pair of Bragg grating sensors, wherein one of the pair of Bragg grating sensors is configured to experience loading strain and the other of the
(Continued)

pair of Bragg grating sensors is configured not to experience loading strain.

20 Claims, 6 Drawing Sheets (51) Int. Cl.

| | | |
|---|---|---|
| *C08K 7/02* | (2006.01) | |
| *C08L 101/00* | (2006.01) | |
| *E21B 47/12* | (2012.01) | |
| *E21B 17/20* | (2006.01) | |
| *G02B 6/02* | (2006.01) | |
| *D07B 1/14* | (2006.01) | |
| *G01D 5/353* | (2006.01) | |
| *C08J 5/04* | (2006.01) | |

(52) U.S. Cl.
CPC ........ *E21B 17/206* (2013.01); *E21B 47/0006* (2013.01); *E21B 47/123* (2013.01); *G01D 5/35303* (2013.01); *G02B 6/02076* (2013.01); *C08J 5/04* (2013.01); *C08J 2300/22* (2013.01); *D07B 2201/2096* (2013.01); *D07B 2301/5513* (2013.01)

(56) References Cited

U.S. PATENT DOCUMENTS

| | | |
|---|---|---|
| 6,041,020 A | 3/2000 | Caron et al. |
| 6,072,567 A | 6/2000 | Sapack |
| 6,359,446 B1 | 3/2002 | Little, Jr. |
| 6,698,288 B2 | 3/2004 | Shirzad et al. |
| 6,838,670 B2 | 1/2005 | Lewis et al. |
| 6,950,545 B1 | 9/2005 | Nomoto et al. |
| 7,080,561 B2 | 7/2006 | Bohlmann et al. |
| 7,086,285 B2 | 8/2006 | Reed |
| 7,176,681 B2 | 2/2007 | Zombo |
| 7,812,616 B2 | 10/2010 | Doyen |
| 7,884,322 B2 | 2/2011 | Sasajima et al. |
| 7,966,883 B2 | 6/2011 | Lorraine et al. |
| 8,000,572 B2 | 8/2011 | Varkey |
| 8,009,946 B2 * | 8/2011 | Xia ................ A61B 5/0059 385/13 |
| 8,286,498 B1 | 10/2012 | Robertson et al. |
| 8,380,328 B2 | 2/2013 | Brooks et al. |
| 8,393,784 B2 | 3/2013 | Ringermacher et al. |
| 8,442,301 B2 | 5/2013 | Dragovich et al. |
| 2005/0111793 A1 | 5/2005 | Grattan et al. |
| 2007/0000682 A1 | 1/2007 | Varkey et al. |
| 2007/0044991 A1 * | 3/2007 | Varkey ............... H01B 7/046 174/102 R |
| 2007/0289741 A1 * | 12/2007 | Rambow ............ E21B 47/0006 166/250.01 |
| 2010/0066315 A1 * | 3/2010 | Diatzikis ............... H02K 11/25 322/99 |
| 2013/0122296 A1 | 5/2013 | Rose et al. |
| 2013/0341009 A1 | 12/2013 | Gonzalez Cancino et al. |
| 2014/0049786 A1 | 2/2014 | Knuepfer et al. |
| 2014/0064028 A1 | 3/2014 | Coates et al. |
| 2014/0278153 A1 * | 9/2014 | Barr ....................... G01L 1/246 702/42 |

OTHER PUBLICATIONS

International Search Report and Written Opinion for PCT/US2015/027904 dated Jul. 20, 2015.

* cited by examiner

POLYMER COMPOSITE WIRELINE CABLES COMPRISING OPTICAL FIBER SENSORS

CROSS-REFERENCE TO RELATED APPLICATIONS

This application claims priority to Provisional U.S. Application 61/994,296, titled "Polymer Composite Wireline Cables Comprising Optical Fiber Sensors," filed on May 16, 2014.

BACKGROUND

The embodiments herein relate generally to equipment utilized during subterranean formation operations and, more particularly, to a polymer composite wireline cable comprising optical fiber sensors and associated methods.

Downhole tools used in well operations may be deployed into, and retrieved from a subterranean formation (e.g., a wellbore therein) using a cable, such as a wireline cable. As used herein, the term "wireline" refers to single-strand or multi-strand wire or cable and may also contain electrical conductors or other electrical components, commonly used in oil or gas operations. For example, wireline cables may be employed to perform well logging operations to gather petrophysical, geophysical, and well production information for a particular subterranean formation. Such wireline cables are required to have sufficient tensile capability to support the weight of the tool and the wireline itself. Accordingly, performance of the wireline cable is particularly important to ensure successful placement or use of the downhole tool.

Characteristics of traditional wireline cables themselves and/or the conditions of a subterranean formation environment may increase the likelihood that such cables fail. For example, wellbore depth, temperatures in excess of 150° C., and extreme pressures may increase strain on the cable, encourage wellbore fluids (e.g., hydrocarbon fluids or gases) to penetrate the cable matrix, and the like, causing delamination or crack-based structural defects in the cable. Moreover, catastrophic failure will occur when the effective loading capability is lower than the applied loading tensile strain.

Wireline cables are often reused and monitoring the integrity of a wireline cable may be particularly difficult due to, among other things, the great length of a wireline. Accordingly, traditional integrity determinations that involve non-destructive inspections may include laser ultrasonic, thermography, microwave, terahertz, RF, eddy current, and/or x-ray radiography techniques. These non-destructive inspections may only analyze the cable surface defects, or result in only a representative portion of the cable being evaluated and not the entire length of the cable (e.g., only single-point non-destructive inspection), absent scanning of the entire length thereof. That is, traditional mechanical fatigue evaluations do not quantitatively evaluate such fatigue against defect number, size, orientation, and the like, for the full length of the cable. Furthermore, traditional non-destructive inspections are more adequate in laboratory settings, rather than in field use.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate generally to equipment utilized during subterranean formation operations and, more particularly, to a polymer composite wireline cable comprising optical fiber sensors and associated methods. As used herein, the term "polymer composite wireline cable" and "wireline cable" may be used interchangeably.

The wireline cables of the present disclosure are capable of being evaluated for mechanical fatigue using a real-time, including while in operation, non-destructive inspection method. Indeed, the wireline cables described herein may be monitored for mechanical fatigue in the speed of light. The wireline cables may be composite cables comprising at least one reinforced fiber embedded into a polymeric matrix material. To monitor the structural defects of the cable, Bragg grating optical fibers (hereinafter "fiber Bragg grating" or "FBG" or "FBG sensor") may be included in the wireline cable at one or more locations. The FBGs are cable of measuring the steady and dynamic strain variations of the cable at the one or more locations where they are placed. In some embodiments, the whole of the wireline cable may include FBGs, so as to monitor the entire length of the cable for mechanical fatigue. In other embodiments, only a portion or multiple portions of the wireline cable may include FBGs, without departing from the scope of the present disclosure.

The wireline cables of the present disclosure are able to be monitored for their structural integrity in real-time, using non-destructive means by employing a combination of methods including time-domain signals, strain amplitudes, frequency-domain signals, power spectral densities, and vibration acoustic spectra. By employing such methods in the embodiments described herein, potential false structural integrity readings may be mitigated, predict catastrophic structural failures, permit representative visualization of wireline cable degradation trends, and the like, and any combination thereof.

The wireline cables described herein may be used for logging purposes, including performing logging operations by delivering and retrieving downhole tools to desired locations of interest within a subterranean formation (e.g., into a wellbore in a subterranean formation), such as for use in oil and gas operations, mineral exploration, water exploration, and the like, and any combination thereof. In some examples, the downhole tool delivered by the wireline cable may include, but is not limited to, a formation tester, a packer, a bridge plug, a perforation gun, a flow control device, a setting tool, a plug, a sampler, and the like, and any combination thereof.

Advantages of the wireline cables comprising the FBGs described herein include the use of the speed of light to monitor in real-time the structural integrity of a wireline cable. Such structural integrity measurements or observations may include, but are not limited to, mechanical strength, degradation development and trends, load straining and straining trends (e.g., average loading strain, average strain amplitude, transient peak strain, and the like), structural defect creation and growth (e.g., crack-defects, delamination, and the like), mechanical failure, and the like, and any combination thereof. That is, each of these structural integrity measurements or observations may be made simultaneously, without departing from the scope of the present disclosure. Many of these structural defects traditionally are only monitored at specific points or require specialized inspection techniques, such as microscopy or electromagnetic waves (e.g., average strain amplitude), which cannot be inspected during operation of a wireline cable. Additionally, the structural integrity of the wireline cables may be monitored using a real-time, non-destructive, single-point inspection; or a real-time, non-destructive, spanning inspection, which accounts for a length or the entire length of the wireline cable.

One or more illustrative embodiments disclosed herein are presented below. Not all features of an actual implementation are described or shown in this application for the sake of clarity. It is understood that in the development of an embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" includes+/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a polymer composite wireline cable comprising at least one reinforced fiber embedded in a polymeric matrix material. Also embedded or otherwise included in the cable are fiber Bragg grating sensors. An FBG is a type of distributed Bragg reflector located in a short segment of an optical fiber. The reflector reflects specific and known wavelengths of light, while transmitting all other wavelengths. The reflector achieves this by creating a periodic variation in the refractive index of the core of the optical fiber, thereby generating a wavelength-specific dielectric mirror. Such reflectors may be inscribed into an optical fiber to create the FBG by any suitable means including, for example, UV laser and laser phase mask technique, such as during fabrication of the optical fiber.

In some embodiments, a pair of FBGs having the same central resonant wavelength may be inscribed at one or more specific cable locations, one of the pair measuring strain and the other compensating for temperature and hydrogen content, as such factors may influence strain. Accordingly, both delamination and crack induced structural fatigue may be measured with an optical spectral analyzer that converts the reflected wavelengths from the FBGs into strain measurements. Additionally, a fast Fourier transform analysis of measured dynamic strain may be used to determine localized vibration frequency from the calculated power spectral density. A fast Fourier transform analysis converts time (or space) into frequency using known algorithms (e.g., the Cooley-Turkey algorithm, the Prime-factor algorithm, Bruun's algorithm, Rader's algorithm, Bluestein's algorithm, and the like). Such dynamic strain and/or frequency spectral density measurements may be used to directly identify potential failure locations and/or the severity of any cable mechanical failures at one or more locations along the length of the wireline cable.

In some embodiments, steady strain may also be measured and directly compared with the designed maximum loading strain value expected to be imposed on the wireline cable. As used herein, "loading strain" may refer to either dynamic strain or steady strain, as discussed in more detail below. Such steady strain may be particularly useful when determining whether a wireline cable may be reused for a subsequent operation after it has already been used one or more times. Such steady strain may be measured at the well site or at a storage location where the wireline cable is kept on a roll, for example. The steady strain may be used to set a failure warning, for example, so that an operator is notified or otherwise made aware of potential failure of the wireline cable and able to take whatever corrective or preventative measures warranted.

Accordingly, the polymer composite wireline cables of the present disclosure are able to provide quantitative strain measurements in real-time along an entire length of the cable without destroying the cable itself (i.e., non-destructive measurements may be taken), thereby providing assurance of the integrity of the wireline during a particular operation (e.g., well logging). In some embodiments, the length of such polymer composite wireline cables may be in the range of a lower limit of about 3050 meters (m), 3450 m, 3750 m, 4050 m, 4350 m, 4650 m, 4950 m, 5250 m, 5550 m, 5850 m, and 6150 m to an upper limit of about 9150 m, 8850 m, 8550 m, 8250 m, 7950 m, 7650 m, 7350 m, 7050 m, 6750 m, 6450 m, and 6150 m in length (or about 10,000 feet to about 30,000 feet in length), encompassing any value and subset therebetween.

In some embodiments, the distance between the each of the pair of FBG sensors may be in the range of a lower limit of about 1 centimeter (cm), 5000 cm, 10000 cm, 15000 cm, 20000 cm, 25000 cm, 30000 cm, 35000 cm, 40000 cm, 45000 cm, and 50000 cm to an upper limit of about 100000 cm, 95000 cm, 90000 cm, 85000 cm, 80000 cm, 75000 cm, 70000 cm, 65000 cm, 60000 cm, 55000 cm, and 50000 cm, encompassing any value and subset therebetween.

In some embodiments, the polymer composite wireline cables provided herein are made from a polymeric matrix reinforced with at least one reinforced fiber embedded therein. In some embodiments, a plurality of reinforced fibers may be embedded in the polymeric matrix to provide structural reinforcement. The number of such reinforced fibers may depend on a number of factors including, but not limited to, the diameter and length of the reinforced fiber and wireline cable, the loading strain expected to be applied to by the wireline cable, the strength of the polymeric matrix itself, the strength of the reinforced fiber itself, and the like. In some embodiments, the reinforced fiber may include, but is not limited to, a carbon fiber, a ceramic fiber, a glass fiber, a metal fiber, and any combination thereof. The polymeric matrix material may be any high-performance thermoplastic polymer, for example. Examples of polymeric matrix materials may include, but are not limited to, polyphenylene sulfide ("PPS"), polysulfone ("PSF"), polyethersulfone ("PES"), polyaryletherketone ("PAEK"), polyetheretherketone ("PEEK"), polyimide ("PI"), any derivative thereof, and any combination thereof. The glass transition temperatures ("Tg") and melting temperatures for each of these polymeric matrix materials is provided in the following Table:

TABLE 1

| Polymeric Matrix Material | Tg (° C.) | Melting Temperature (° C.) |
|---|---|---|
| PPS | 90 | 285 |
| PSF | 190 | Amorphous |
| PES | 225 | Amorphous |
| PAEK | 138 | 320-380 |
| PEEK | 145 | 335 |
| PI | 320 | 385 |

The cables may further comprise at least one optical fiber embedded in the polymeric matrix material, the optical fibers having one or more fiber Bragg grating sensors inscribed thereon. It will be appreciated that greater than one optical fiber may be embedded in the polymeric matrix material, without departing from the scope of the present disclosure, such as greater than two, greater than three, greater than five, greater than ten, greater than 15, greater than 20, or even more). In some embodiments, the wireline cable may further comprise one or more additional optical fibers that do not have FBG sensors and are capable of logging telemetry and distributed temperature sensing. Further, in some embodiments, the polymer composite wireline cables of the present disclosure may be encased or otherwise protected by a sheath surrounding the wireline cable. The protective sheath may be composed of any material capable of use in a subterranean formation that is able to provide resistance to high temperatures, abrasion, shear, and other forces encountered in the formation of interest. Such materials may include, but are not limited to, a metal (e.g., stainless steel, copper, and the like) or a polymer (e.g., polyaryletherether ketone, polytetrafluoroethylene, and the like).

Figure 1A:
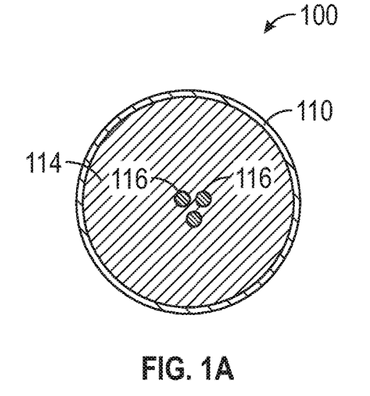
FIGS. 1A,B illustrate configurations of the polymer composite wireline cable, according to one or more embodiments described herein.
Figure 1B:
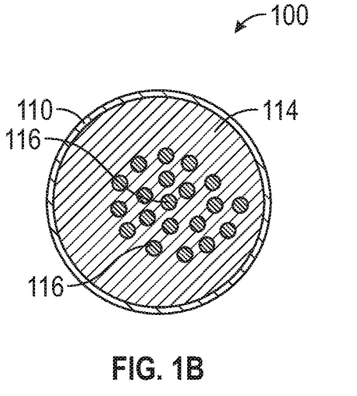

Referring now to FIGS. 1a and 1b, illustrated are cross-sections of two configuration embodiments of the polymer composite wireline cable of the present disclosure. Polymer composite wireline cable 100 comprises a polymeric matrix material 114 comprising one or more reinforced fibers (not shown) embedded therein and a protective sheath 110 surrounding the polymeric matrix material 114 and embedded reinforced fiber(s). Also embedded in the wireline cable 100 are one or more optical fibers 116. As shown in FIG. 1a, three optical fibers 116 are shown positioned substantially in the center of the wireline cable 100. However, it will be appreciated that the location of the optical fibers 116 within the wireline cable 100, without departing from the scope of the present disclosure, such as along the perimeter of the protective sheath 110 or any location between the perimeter of the protective sheath 110 and the center of the wireline cable 100. Moreover, the patterning of the optical fibers 116 may be uniform or randomly distributed within the polymeric matrix material 114, without departing from the scope of the present disclosure. The number of optical fibers 116 may additionally be less than or greater than the three optical fibers 116 depicted in FIG. 1a. For example, as shown in FIG. 1b, greater than three optical fibers 116 may be embedded in the polymeric matrix material 114, according to the embodiments described herein. It will be appreciated that an even greater number of optical fibers 116 may be included in the embodiment shown in FIG. 1b, without departing from the scope of the present disclosure. Additionally, the fiber distribution may be evenly distributed, unevenly distributed, or randomly distributed, without departing from the scope of the present disclosure.

Figure 2:
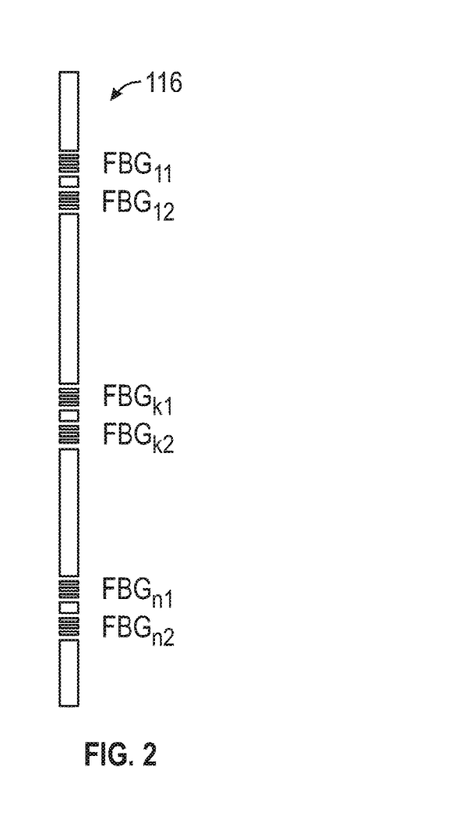
FIG. 2 illustrates three FBG sensor pairs along an optical fiber for use in a polymer composite wireline cable, according to one or more embodiments described herein.

The one or more FBGs may be placed along at least one optical fiber included as part of the polymer composite wireline cable. In some embodiments, the FBGs are included in pairs inscribed at specific locations along the length of the optical fiber which may extend throughout the entire length of the wireline cable or may be shorter than the cable and other optical fibers having FBGs included therein may account for other lengths along the cable. As an illustration, as shown in FIG. 2, and with continued reference to FIGS. 1a,b, three FBG pairs, represented by $FBG_{11}$ and $FBG_{12}$, $FBG_{k1}$ and $FBG_{k2}$, and $FBG_{n1}$ and $FBG_{n2}$, are inscribed along the length of an optical fiber 116. The location of each pair of FBG along the optical fiber 116, as well as in relation to any other FBG or FBG pair is not limiting and may be at any location and in any configuration, without departing from the scope of the present disclosure.

Each FBG may have a particular refractive index and, in some embodiments, the refractive index may be a modulated pattern that is of a length in the range of a lower limit of about 3 millimeters (mm), 3.5 mm, 4 mm, 4.5 mm, 5 mm, 5.5 mm, and 6 mm to about 10 mm, 9.5 mm, 9 mm, 8.5 mm, 8 mm, 7.5 mm, 7 mm, 6.5 mm, and 6 mm, encompassing any value and subset therebetween. The paired FBGs may have the same central resonant wavelength, $\lambda_0$ (units: nanometers (nm)), determined by the following equation:

$$\lambda_0 = 2 \cdot n \cdot \Lambda \qquad \text{Equation 1}$$

wherein n is the refractive index of the optical fiber core (unitless) and $\Lambda$ is the pitch grating size of the FBG (units: micrometers (μm)). Because pitch grating size change leads to wavelength change, a FBG can be used as a strain sensor, also taking into account other contributory factors, such as temperature.

As mentioned previously and as shown in FIG. 2, the FBGs may be in pairs along the length of the optical fiber core in the polymer composite wireline cable. For illustration, reference to $FBG_{11}$ and $FBG_{12}$ from FIG. 2 will be used. One of the pairs, $FBG_{11}$, may be embedded in the cable such that it encounters loading strain and has a representative load-wavelength, $\lambda_1$ (units: nm), represented by the following equation, as a function of time:

$$\frac{\Delta \lambda_1(t)}{\lambda_o} = \kappa_\varepsilon \cdot (\varepsilon_{load}(t) + \varepsilon_{thermal}(t)) + \kappa_T \cdot \Delta T + \kappa_{H2} \cdot \Delta n(t)/n \qquad \text{Equation 2}$$

wherein $\kappa_\in$ is the strain sensitivity of the FBG (units: picometer per micro-strain (pm/μ∈)); $\in_{load}(t)$ is the loading strain (units: μ∈); $\in_{thermal}(t)$ is the thermal strain (units: μ∈); $\kappa_T$ is the temperature sensitivity of the FBG (units: about 10 picometers per Kelvin); $\Delta T$ is the change in temperature (units: Kelvin); $\kappa_{H2}$ is the hydrogen darkening sensitivity (units: hydrogen absorption loss in decibels per kilometer (dB/km) at a given wavelength (e.g., 1550 nanometers (nm)); and $\Delta n(t)/n$ is the relative refractive index change by hydroxyl ion absorption (units: about 3 picometers (pm) per atmosphere at a given wavelength (e.g., 1550 nm)). In some embodiments, the second term is the thermo-optic effect (dn/dT) and the third term is the elasto-optic effect (dn/d∈), all of which may contribute to FBG sensor wavelength changes. Additionally, $\in_{thermal}(t)$ varies due to the mismatch of thermal expansion coefficients from the optical fiber having the FBG sensor thereon and the polymeric matrix material, which is slow varied quantity throughout the subterranean formation. However, the loading strain, $\in_{load}(t)$, when used to determine dynamic strain, is related to the specific wireline cable loading operation. Accordingly, Equation 2 takes into account thermal strain, loading strain, temperature induced contributions, and hydrogen invasion contributions to the FBG resonant wavelength shift. The hydrogen invasion contributions may be proportional to relative refractive index change by hydroxyl ion absorption in a subterranean formation environment, for example.

In some embodiments, the strain sensitivity of the FBG is in the range of a lower limit of about 0.75 pm/μ∈, 0.775 pm/pμ∈, 0.8 pm/μ∈, 0.825 pm/μ∈, 0.85 pm/pμ∈, 0.875 pm/μ∈, and 0.9 pm/μ∈ to an upper limit of about 1.5 pm/μ∈, 1.25 pm/μ∈, 1.0 pm/μ∈, 0.975 pm/μ∈, 0.95 pm/μ∈, 0.925 pm/μ∈, and 0.9 pm/μ∈, encompassing any value and subset therebetween. When in pairs, the FBG pairs may have the same or different strain sensitivities, without departing from the scope of the present disclosure.

The other of the pair, $FBG_{12}$, may be positioned in the cable next to or otherwise adjacent to $FBG_{11}$, such that it does not encounter loading strain. Its load-wavelength, $\lambda_2$, may be represented by the following equation:

$$\frac{\Delta \lambda_2(t)}{\lambda_o} = \kappa_\varepsilon \cdot \varepsilon_{thermal}(t) + \kappa_T \cdot \Delta T + \kappa_{H2} \cdot \Delta n(t)/n \qquad \text{Equation 3}$$

$FBG_{11}$ and $FBG_{12}$ may then be compared to determine the loading strain encountered by the polymer composite wireline cable at a particular location, as shown by the following equation:

$$\in_{load}(t) = (\Delta \lambda_1(t) - \Delta \lambda_2(t))/(\lambda_0 \cdot \kappa_\in) \qquad \text{Equation 4}$$

That is, the difference between the two wavelengths of $FBG_{11}$ and $FBG_{12}$ is determined to measure the loading strain experienced by the polymer composite wireline cable at any particular location because the two FBGs are identical except that $FBG_{12}$ is not encountering loading strain due to its particular arrangement in the cable, whereas $FBG_{11}$ is experiencing such loading strain. Equation 4 may be used to determine either or both of dynamic strain during use of the wireline cable in a subterranean formation operation (e.g., during logging) or steady strain when the wireline cable is not in use (e.g., during storage). Steady strain may be particularly useful in determining whether a wireline cable may be reused in another operation without failure or substantial risk of failure.

In some embodiments, FBG2 may be embedded in the polymer composite wireline cable such that it does not encounter loading by including it in a loosed tube, for example, to protect it from encountering loading strain from the cable. Other configurations may be possible without departing from the scope of the present disclosure, however. For example, one of the optical fibers may be used with a Raman distributed temperature sensing method to determine local temperatures that may be deleted or otherwise removed from the wavelength output for FBG sensors experiencing loading strain. In some embodiments, the Raman distributed temperature method may be used in conjunction with the paired FBG sensors described herein to provide redundant measurement readings, thereby ensuring their accuracy.

Figure 3A:
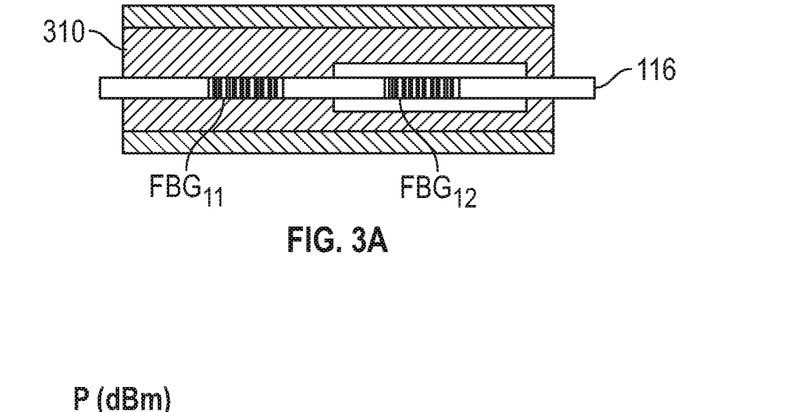
FIGS. 3A-C illustrate a configuration of an FBG sensor pair in a polymer composite wireline cable and associated loading plots absent a load strain and under a load strain, according to one or more embodiments described herein.
Figure 3B:
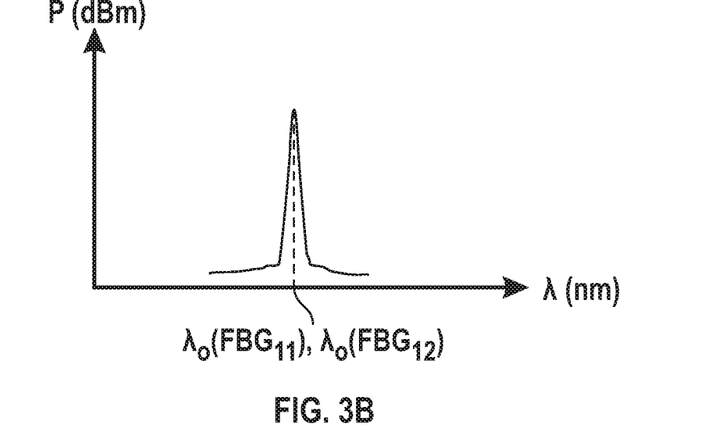
Figure 3C:
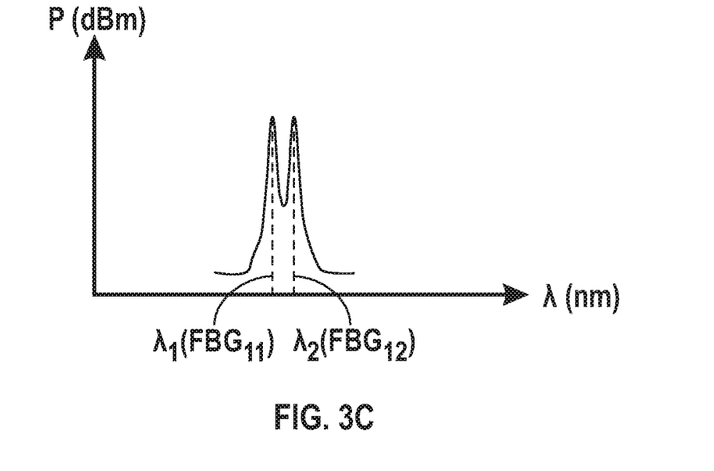

Referring now to FIG. 3a, with continued reference to FIGS. 1a,b and 2, illustrated is a polymer composite wireline cable 310, which as described herein, may be a composed of a polymeric matrix material (e.g., a thermoplastic). Embedded in the wireline cable 310 is an optical fiber 116 having two FBG pairs, $FBG_{11}$ and $FBG_{12}$. As depicted, $FBG_{11}$ is embedded into the wireline cable 310 such that it experiences a loading, whereas $FBG_{12}$ is embedded into the wireline cable 310 in a configuration such that it does not encounter a loading, which is represented by the blank space surrounding $FBG_{12}$. Accordingly, referring now to FIG. 3b, when the wireline cable of FIG. 3a does not experience additional loading, that is, the wireline cable 310, as well as $FBG_{11}$ nor $FBG_{12}$, do not experience loadings other than those imposed without a loading strain, such as due to temperature, the central resonant wavelengths of $FBG_{11}$, $\lambda_0(FBG_{11})$, and $FBG_{12}$, $\lambda_0(FBG_{12})$ are identical, as shown in FIG. 3b plotted against power (P) (units: decibel-milliwatts (dBm)). However, when the wireline cable 310 experiences loading, only $FBG_{11}$ will experience the loads, such that the representative load-wavelengths under the loading strain of the wireline cable 310 of $FBG_{11}$, $\lambda_1(FBG_{11})$ shifts away from that of $FBG_{12}$, $\lambda_2(FBG_{11})$, as shown in FIG. 3c. Accordingly, the loading strain experienced may be evaluated based on the difference between the load-wavelength of $FBG_{11}$ and $FBG_{12}$ while the wireline cable 310 is under a loading strain, as shown by the following equation:

$$\Delta \lambda_{11/12}(t) = \lambda_1(FBG_{12}) - \lambda_2(FBG_{11}) \qquad \text{Equation 5}$$

In some embodiments, the entire length of the polymer composite wireline cable may be monitored using multiple pairs of FBGs along the length of the cable. By doing so, localized strain variations may be determined in real-time by comparing the wavelengths of each pair of FBGs. In some embodiments, each pair of FBGs will resonate at different wavelengths or alternating wavelengths such that no pair next to another pair resonates the same wavelength. In such cases, the location of each pair relative to the length of the polymer composite wireline cable may be known and monitored accordingly.

Figure 4A:
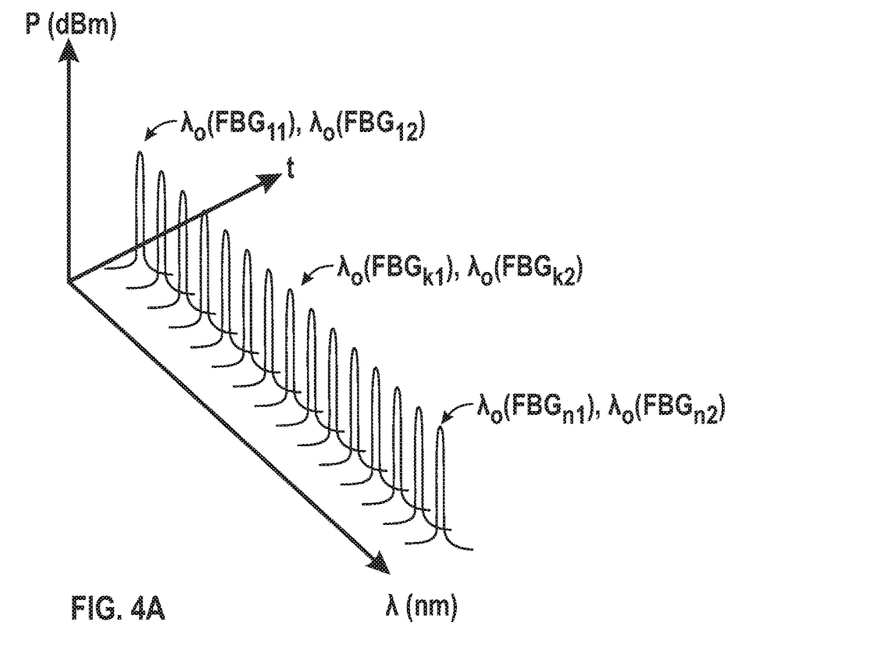
FIGS. 4A,B illustrate loading plots absent a load strain and under a load strain for a cascade of FBG sensor pairs, according to one or more embodiments described herein.
Figure 4B:
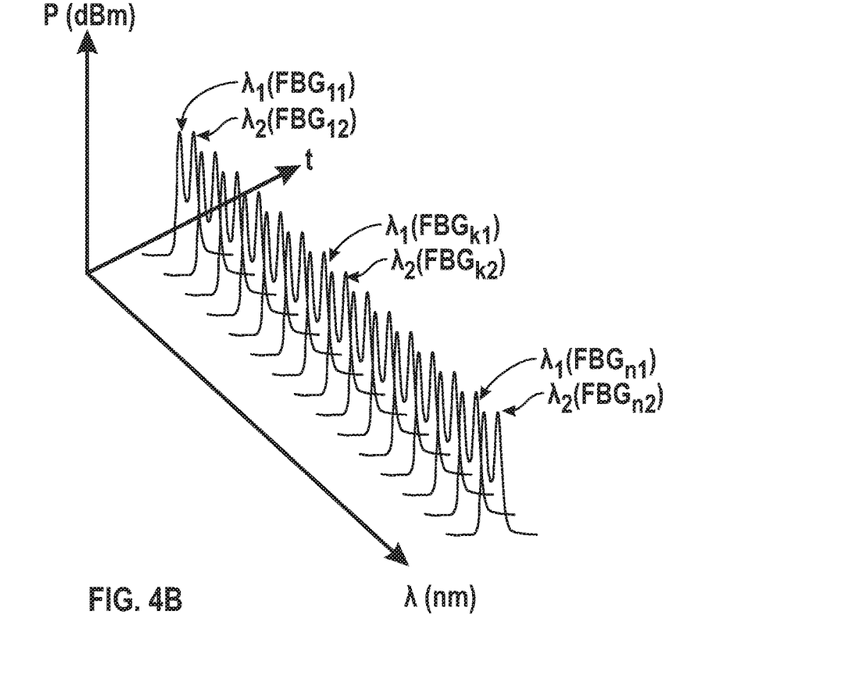

Similarly, a full length of a polymer composite wireline having multiple FBG pairs may be evaluated nondestructively for loading strain. For example, as depicted in FIG. 4a, a cascade of FBG pairs may be evaluated initially in a polymeric composite wireline that is not exposed to loading strain for their central resonant wavelengths, as described above. As shown, three pairs of FBGs, $FBG_{11}$ and $FBG_{12}$, $FBG_{\kappa 1}$ and $FBG_{\kappa 2}$, and $FBG_{n1}$ and $FBG_{n2}$, are represented, although, as shown, other FBG pairs therebetween are also depicted but not labeled. Without loading, as shown in FIG. 4a, the central resonant wavelengths of each of $FBG_{11}$, $\lambda_0(FBG_{11})$, and $FBG_{12}$, $\lambda_0(FBG_{12})$, are identical; the central resonant wavelengths of each of $FBG_{\kappa 1}$, $\lambda_0(FBG_{\kappa 1})$, and $FBG_{\kappa 2}$, $\lambda_0(FBG_{\kappa 2})$, are identical; and the central resonant wavelengths of each of $FBG_{n1}$, $\lambda_0(FBG_{n1})$, and $FBG_{n2}$, $\lambda_0(FBG_{n2})$, are identical. Upon applying a load strain to the wireline cable comprising these FBG pairs, as shown in FIG. 4b, the loading strain experienced may be evaluated based on the difference between the load-wavelength difference between each FBG pair. That is, the load strain may be evaluated based on the difference between the load-wavelengths of $FBG_{11}$, $\lambda_1(FBG_{11})$, and $FBG_{12}$, $\lambda_2(FBG_{12})$; the load-wavelengths of $FBG_{k1}$, $\lambda_1(FBG_{\kappa 1})$ and $FBG_{\kappa 2}\lambda_2(FBG_{\kappa 2})$; and the load-wavelengths of $FBG_{n1}$, $\lambda_1(FBG_{n1})$, and $FBG_{12}$, $\lambda_2(FBG_{n2})$, as shown in FIG. 4b.

Knowledge of the location of any pair of FBGs based on their reflected wavelength allows monitoring for mechanical fatigue during operation, for example, and the loss of any one FBG wavelength (e.g., the inability to detect the reflected wavelength) may indicate loss of mechanical strength of the wireline cable at the location of that pair or a defect at that location (e.g., the formation of a crack). Complete loss of an FBG sensor may indicate a crack of size at least comparable to the waveguide cross section. In other situations, an unexpected shift or otherwise discontinuous detected wavelengths from a pair of FBGs may indicate a defect and an operator may be able to determine the severity of such a defect based on the severity of the discontinuity of the detected wavelengths. For example, the wavelength may show a continuous downward or upward trend as a function of time, and a threshold may be set to alert an operator to an unacceptable shift that may indicated potential failure of the wireline cable prior to actual failure, thus providing a timely warning so that appropriate corrective measures may be taken.

Catastrophic failure of the polymer composite wireline cable may also be determined using the FBG sensor pairs, or single FBG sensors, of the present disclosure. Such catastrophic failure may be the result of the actual strain of the cable being greater than the maximum value permitted for a particular cable configuration/composition. Such maximum value may depend on a number of factors including, but not limited to, the type of polymeric matrix material, the amount of carbon fibers embedded therein, whether the cable is encased in a protective sheath, and the like.

Figure 5A:
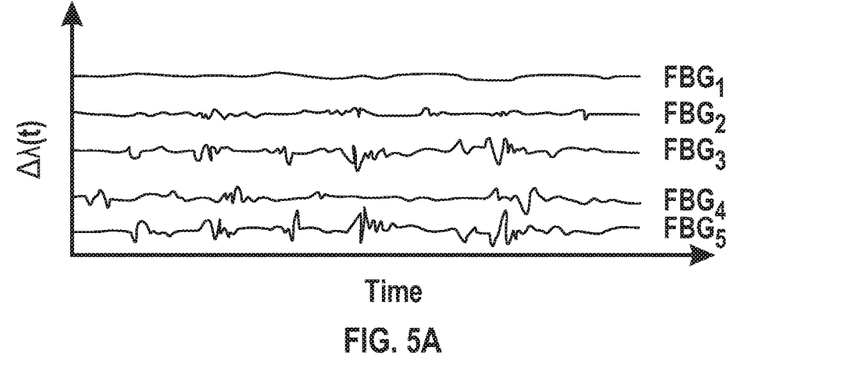
FIGS. 5A,B illustrate sensor wavelength plots for a plurality of FBG sensors before and after catastrophic failure of a portion of the FBGs, according to one or more embodiments described herein.
Figure 5B:
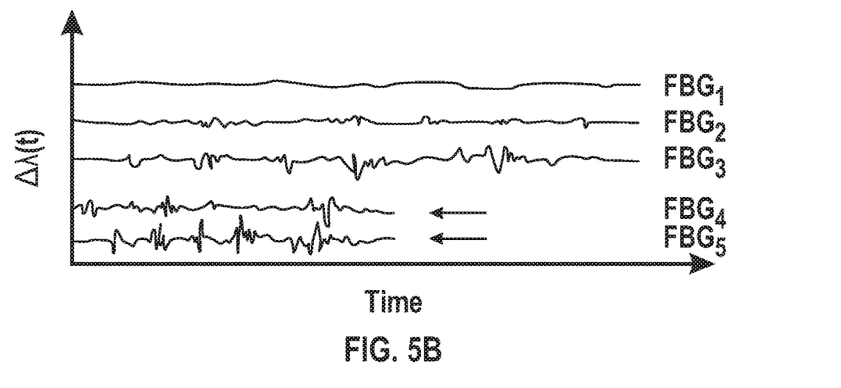

Referring now to FIGS. 5a and 5b, illustrated are a sensor wavelength ($\lambda(t)$) plots monitoring five FBG sensors against time. FIG. 5a represents the five FBG sensors during operation of a polymer composite wireline in which they are embedded. As shown, various fluctuations in the wavelengths may be observed. As discussed in detail below, when such variations demonstrate continuous downward or upward trends as a function of time or abrupt downward or upward fluctuations may indicate crack-based or delamination defects in the wireline cable. Referring now to FIG. 5b, when a catastrophic failure in the wireline cable occurs, any FBG sensor at or below that failure will cease to provide wavelength information, as depicted by the bold arrows. Accordingly, an operator may be aware in real-time whether a wireline cable is no longer effectively operating, and may initiate corrective measures accordingly. As shown, FIGS. 5a,b depict five FBG sensors, however, the number of FBG sensors or pairs of FBG sensors may be any number suitable for use in a particular wireline cable, without departing from the scope of the present disclosure.

The actual strain of a wireline cable includes steady strain, strain induced by the weight of the downhole tool being towed by the cable, and dynamic strain, including the strain by the wireline cable weight itself. Because a wireline cable may be, for example, moving in a subterranean formation downward at a rate of about 18 meters/minute to about 92 meters/minute, the dynamic strain from the cable weight may be 10% or more greater than steady strain and tool weight induced strain.

In some embodiments, the strain amplitude may be used as one of the wireline cable structural integrity parameters while monitoring the FBGs, so as to ensure that all cable failure parameters are being evaluated. The baseline of the strain amplitude may be determined by the weight of the downhole tool being towed by the wireline cable and by the length of the wireline cable, as determined by the following equation:

$$\varepsilon_{load}(t) = \frac{Mg}{A} + (\rho g / A) \cdot z(t) \qquad \text{Equation 6}$$

wherein M is the downhole tool weight, g is gravity, A is the cross-sectional area of the wireline cable, $\rho$ is the wireline cable density, and z is the length of the wireline cable. As the wireline cable traverses downward into a subterranean formation, the loading strain may increase linearly and the FBG sensors may provide such information as strain amplitude.

Figure 6:
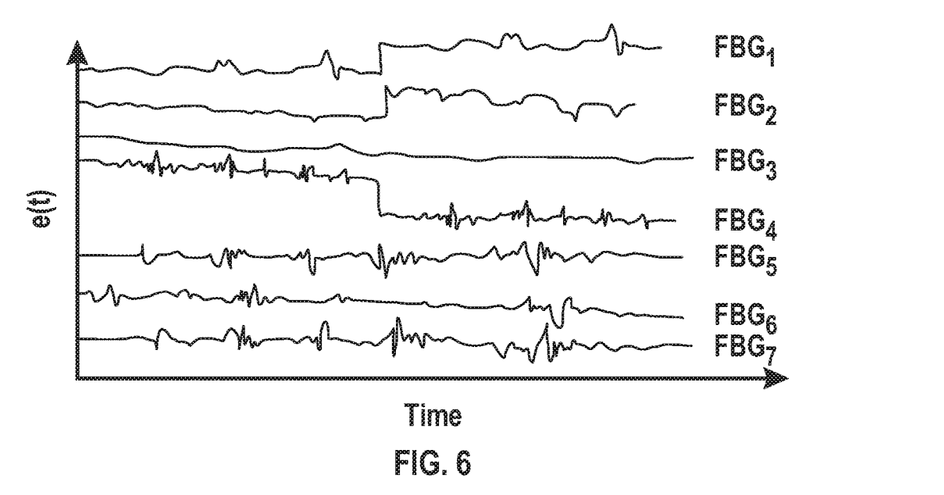
FIG. 6 illustrates a strain amplitude plot for a plurality of FBG sensors, according to one or more embodiments described herein.

Referring now to FIG. 6, illustrated is a strain amplitude ($\in(t)$) plot monitoring seven FBG sensors against time. FIG. 6 demonstrates the use of strain amplitude to identify delamination and crack-based structural defects that may occur in a polymer composite wireline cable comprising optical fibers including the FBG sensors (or pairs of FBG sensors). The sharp upward increase in strain amplitude experienced by FBG1 and FBG2, as well as the sharp downward decrease in strain amplitude experienced by FBG4, each without recovery back to the previous relatively steady strain amplitude may indicate delamination or crack-based structural defects (e.g., high or low frequency fluctuations). Similarly, although not depicted, steady decreases or increases over time of such strain amplitude may indicate delamination or crack-based structural defects. Accordingly, an operator may be aware in real-time whether a wireline cable is subject to such defects which may lead to failure, and may initiate corrective measures accordingly. For example, an operator may set a threshold strain amplitude window that if exceeded in either an upward or downward strain amplitude direction may trigger an operator to further investigate, cease operations, and/or employ corrective measures before wireline cable failure occurs. As shown, FIG. 6 depicts seven FBG sensors, however, the number of FBG sensors or pairs of FBG sensors may be any number suitable for use in a particular wireline cable, without departing from the scope of the present disclosure.

Figure 7A:
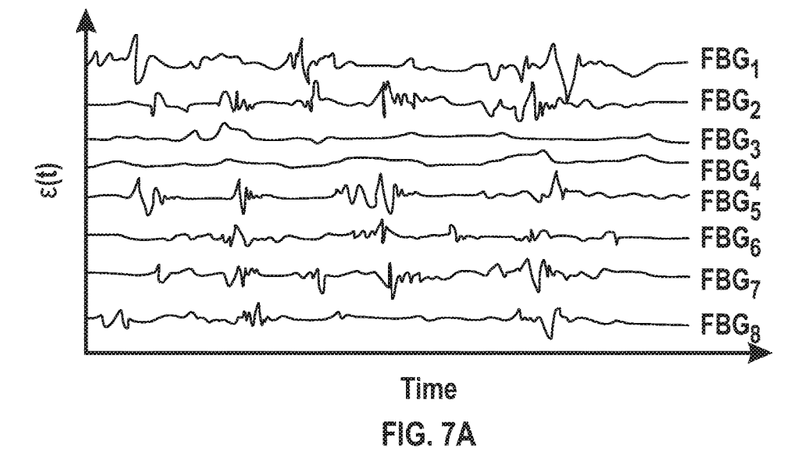
FIGS. 7A,B illustrate a strain amplitude plot and a converted power spectral density plot for a plurality of FBG sensors, according to one or more embodiments described herein.
Figure 7B:
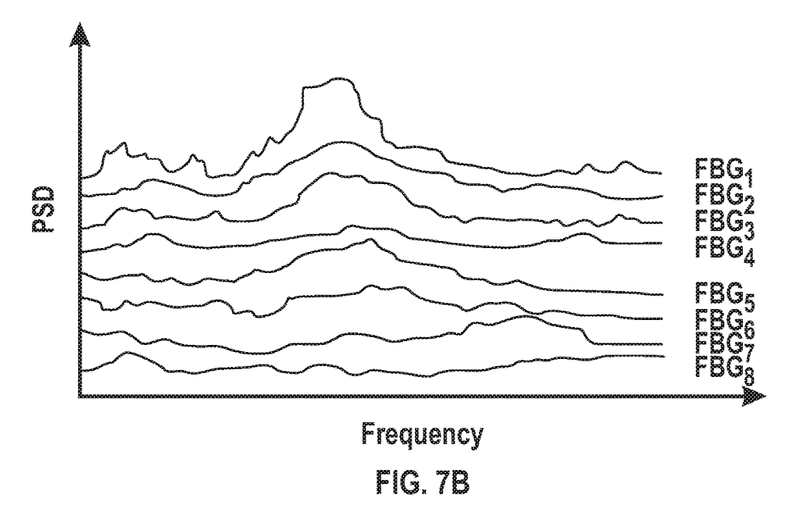

In some embodiments, the strain amplitude may be converted into localized vibration frequency based on its power spectral density (PSD) using fast Fourier transform analysis. Such conversion is illustrated in FIGS. 7a and 7b, where FIG. 7a depicts a strain amplitude ($\in$(t)) plot monitoring eight FBG sensors against time, and FIG. 7b depicts the same eight FBG sensors where the plot has been converted into power spectral density against frequency. The power spectral density of the wireline cable analyzed against frequency (also referred to as frequency-domain signal processing) may also permit an operator to obtain baseline characteristics (e.g., mechanical integrity) of the wireline cables described herein, and its remaining mechanical strength based on its power spectral density. Generally, upward shifts in the frequency indicate structural defects, and downward shifts in the PSD indicate defect growth and propagation. The vibration frequency may be monitored to identify any trends relating to cable degradation or mechanical fatigue of the wireline cable at a particular location where the FBGs are positioned. For example, if the vibration frequency downshifts, it may be a sign of integrity failure. Additionally, unexpected vibration frequencies may be monitored to determine potential internal structural changes in the wireline cable itself, such as density change, elastic modulus, material failure, and the like.

The FBG sensors may be monitored in real-time using optical signal processing system, which may permit visualization of the various plots depicted in FIGS. 3b-7b. Such optical signal processing equipment may utilize light scattering and may comprise a broadband electromagnetic radiation source of light that optically interacts with the optical fiber and the FBGs located thereon, such as an edge emitting light diode or a laser, and appropriate equipment for delivery of a light signal from the light source, such as beam expanding optics and one or more waveguide couplers, to the optical fiber having at least one pair of FBG sensors inscribed thereon. In some embodiments, the light source may emit a light wavelength of between a lower limit of about 1 micrometers (μm), 1.05 μm, 1.1 μm, 1.15 μm, 1.2 μm, 1.25 μm, and 1.3 μm to an upper limit of about 1.6 μm, 1.55 μm, 1.5 μm, 1.45 μm, 1.4 μm, 1.35 μm, and 1.3 μm, encompassing any value and subset therebetween. In some embodiments, the light source may emit a light wavelength of 1.55 μm. Additionally, the optical signal processing equipment may include appropriate signal analysis equipment for analyzing the return (i.e., the optically interacted, or reflected) signal wavelengths from the FBG sensors. The light signal passes through the core of the optical fiber until it reaches the at least one pair of FBG sensors, which reflect a known, narrow wavelength band of light therefrom. Light that is not reflected by the first pair of FBGs may continue to transmit along the optical fiber to contact any additional FBG pairs that may be along the length of the optical fiber in the polymer composite wireline cable, which again reflects a narrow wavelength of light. The end of the optical fiber may be terminated with an anti-reflective material or otherwise configured (e.g., cut with an angle of about 8°) to prevent reflection of light therefrom, such that interference with the FBG reflective wavelengths is prevented or substantially reduced.

The signal analysis equipment may include a standard optical spectral analyzer having a processor for processing, storing in memory, and displaying visually to a user the reflected wavelengths (also referred to as optically interacted light wavelengths), as discussed previously, from the FBG pairs from a computer monitor. The signal analysis equipment is capable of converting the reflected wavelength signal into an electronic signal, such as a high-speed linear photodetector array, a CCD array, or a CMOS array. In some embodiments, the processor may be provided with a user interface for input and control, such as by generating reports, performing a fast Fourier transform analysis, determining the strain amplitude of the polymer composite wireline cable, or determining the loading strain at a particular location along the polymer composite wireline cable where one or more FBG pairs are located.

Figure 8:
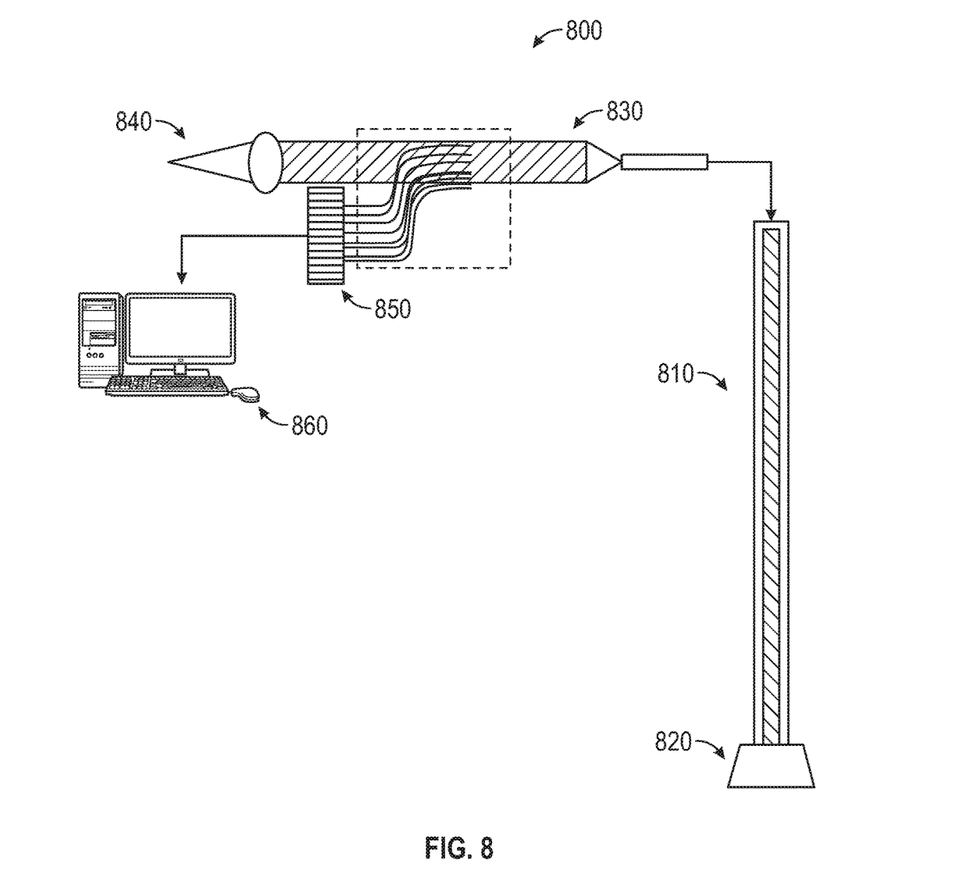
FIG. 8 illustrates a system comprising a polymer composite wireline cable and signal processing system, according to one or more embodiments described herein.

Referring now to FIG. 8, illustrated is a non-limiting optical signal processing system 800 that may be used to monitor the FBG sensors of the present disclosure, according to one or more embodiments of the present disclosure. As depicted, a polymer wireline cable 810, which may be lowered into a subterranean formation (not shown) (e.g., into a wellbore in a subterranean formation) for performing a number of operations. The subterranean formation may be of any composition and may be subsea, onshore, or offshore, without departing from the scope of the present disclosure. The wireline cable 810 may be configured to mechanically or otherwise attach a downhole tool 820 thereto. The downhole tool 820 may be any downhole tool, including those discussed herein. As shown, the wireline cable 810 is connected to waveguide coupler 830, which receives light from an electromagnetic radiation source 840. Light from the electromagnetic radiation source 840 may be delivered to the wireline cable 810 through the waveguide coupler 830 and reflect back to an optical spectral analyzer 850, where a signal corresponding to the loading strain on the wireline cable 810 may be displayed on data processing equipment 860, such as a standard computer.

Embodiments disclosed herein include Embodiment A, Embodiment B, and Embodiment C.

Embodiment A

A polymer composite wireline cable comprising: a polymeric matrix material; at least one reinforced fiber embedded in the polymeric matrix material; and at least one optical fiber disposed in the polymeric matrix material, the at least one optical fiber having at least one pair of Bragg grating sensors, wherein one of the pair of Bragg grating sensors is configured to experience loading strain and the other of the pair of Bragg grating sensors is configured not to experience loading strain.

Embodiment B

A method comprising: providing a polymer composite wireline cable comprising: a polymeric matrix material, at least one reinforced fiber embedded in the polymeric matrix material, and at least one optical fiber disposed in the polymeric matrix material, the at least one optical fiber having at least one pair of Bragg grating sensors, wherein one of the pair of Bragg grating sensors is configured to experience loading strain and the other of the pair of Bragg grating sensors is configured not to experience loading strain; and introducing the polymer composite wireline cable into a subterranean formation.

Embodiment C

A system comprising: a wellbore in a subterranean formation; a polymer composite wireline cable in the wellbore, the polymer composite wireline cable comprising: a polymeric matrix material, at least one reinforced fiber embedded in the polymeric matrix material, and at least one optical fiber disposed in the polymeric matrix material, the at least one optical fiber having at least one pair of Bragg grating sensors, wherein one of the pair of Bragg grating sensors is configured to experience loading strain and the other of the pair of Bragg grating sensors is configured not to experience loading strain.

Each of Embodiment A, Embodiment B, and Embodiment C may have one or more of the following additional elements in any combination:

Element 1: Wherein the polymer matrix material is a high-performance thermoplastic polymer.

Element 2: Wherein the polymer matrix material is a high-performance thermoplastic polymer, and wherein the high-performance thermoplastic polymer is selected from the group consisting of polyphenylene sulfide, polysulfone, polyethersulfone, polyaryletherketone, polyetheretherketone, polyimide, any derivative thereof, and any combination thereof.

Element 3: Wherein the reinforced fiber is selected from the group consisting of a carbon fiber, a ceramic fiber, a glass fiber, a metal fiber, and any combination thereof.

Element 4: Wherein the one of the pair of the Bragg grating sensors configured to experience loading strain measures both loading strain and temperature, and the other of the pair of the Bragg grating sensors configured not to experience loading strain measures temperature only.

Element 5: Wherein the one of the pair of the Bragg grating sensors configured to experience loading strain, and the other of the pair of the Bragg grating sensors configured not to experience loading strain are located on the fiber optical cable and separated by a length in the range of about 1 cm to about 100000 cm.

Element 6: Wherein the pair of Bragg grating sensors each has a strain sensitivity in the range of about 0.75 pm/µ∈ to about 10.5 pm/µ∈.

Element 7: Wherein the pair of Bragg grating sensors each as a refractive index having a modulated pattern that is of a length in the range of about 3 mm to about 10 mm.

Element 8: Wherein the polymer composite wireline cable has a length of about 3050 m to about 9150 m.

Element 9: Further comprising measuring both loading strain and temperature with the one of the pair of the Bragg grating sensors configured to experience loading strain, and measuring temperature only with the other of the pair of the Bragg grating sensors configured not to experience loading.

Element 10: Further comprising determining strain amplitude of the polymer composite wireline cable.

Element 11: Further comprising determining strain amplitude of the polymer composite wireline cable, and converting the strain amplitude into localized vibration frequency.

Element 12: Further comprising an optical signal processing system comprising a broadband electromagnetic radiation source and signal analysis equipment, and further comprising: optically interacting light emitted from the broadband electromagnetic radiation source with the pair of Bragg grating sensors, and receiving the optically interacted light as optically interacted light wavelengths with the signal analysis equipment.

Element 13: Further comprising an optical signal processing system comprising a broadband electromagnetic radiation source and signal analysis equipment, and further comprising: optically interacting light emitted from the broadband electromagnetic radiation source with the pair of Bragg grating sensors, and receiving the optically interacted light as optically interacted light wavelengths with the signal analysis equipment, and wherein the signal analysis equipment comprises a computer monitor, and further comprising visually displaying the optically interacted light wavelengths on the computer monitor.

Element 14: Further comprising an optical signal processing system comprising a broadband electromagnetic radiation source and signal analysis equipment, and further comprising: optically interacting light emitted from the broadband electromagnetic radiation source with the pair of Bragg grating sensors, and receiving the optically interacted light as optically interacted light wavelengths with the signal analysis equipment, and further comprising converting the optically interacted light wavelengths into an electric signal with the signal analysis equipment.

By way of non-limiting example, exemplary combinations applicable to Embodiment A, Embodiment B, and Embodiment C include: 1, 2, 3, and 9; 6, 10, and 11; 2, 8, 13, 14, and 15; 1, 2, 3, 4, 5, 6, 7, 8, 9, 10, 11, 12, 13, 14, and 15; 13 and 15; 4, 9, and 12; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:
1. A polymer composite wireline cable comprising:
a polymeric matrix material;

at least one reinforced fiber embedded in the polymeric matrix material; and at least one optical fiber disposed in the polymeric matrix material, the at least one optical fiber having at least one pair of Bragg grating sensors, wherein one of the pair of Bragg grating sensors is configured to experience loading strain and the other of the pair of Bragg grating sensors is configured not to experience loading strain, the pair of Bragg grating sensors are located on the same fiber optical cable, and the pair of Bragg grating sensors have the same central resonant wavelength.

2. The polymer composite wireline cable of claim 1, wherein the polymer matrix material is a high-performance thermoplastic polymer.

3. The polymer composite wireline cable of claim 2, wherein the high-performance thermoplastic polymer is selected from the group consisting of polyphenylene sulfide, polysulfone, polyethersulfone, polyaryletherketone, polyetheretherketone, polyimide, any derivative thereof, and any combination thereof.

4. The polymer composite wireline cable of claim 1, wherein the reinforced fiber is selected from the group consisting of a carbon fiber, a ceramic fiber, a glass fiber, a metal fiber, and any combination thereof.

5. The polymer composite wireline cable of claim 1, wherein the one of the pair of the Bragg grating sensors configured to experience loading strain both measures loading strain and temperature, and the other of the pair of the Bragg grating sensors configured not to experience loading strain measures temperature only.

6. The polymer composite wireline cable of claim 1, wherein the one of the pair of the Bragg grating sensors configured to experience loading strain, and the other of the pair of the Bragg grating sensors configured not to experience loading strain are separated by a length in the range of about 1 cm to about 100000 cm.

7. The polymer composite wireline cable of claim 1, wherein the pair of Bragg grating sensors each has a strain sensitivity in the range of about 0.75 pm/µ∈ to about 10.5 pm/µ∈.

8. The polymer composite wireline cable of claim 1, wherein the pair of Bragg grating sensors each as a refractive index having a modulated pattern that is of a length in the range of about 3 mm to about 10 mm.

9. The polymer composite wireline cable of claim 1, wherein the polymer composite wireline cable has a length of about 3050 m to about 9150 m.

10. A method comprising:
providing a polymer composite wireline cable comprising:
a polymeric matrix material,
at least one reinforced fiber embedded in the polymeric matrix material, and
at least one optical fiber disposed in the polymeric matrix material, the at least one optical fiber having at least one pair of Bragg grating sensors, wherein one of the pair of Bragg grating sensors is configured to experience loading strain and the other of the pair of Bragg grating sensors is configured not to experience loading strain, the pair of Bragg grating sensors are located on the same fiber optical cable, and the pair of Bragg grating sensors have the same central resonant wavelength; and introducing the polymer composite wireline cable into a subterranean formation.

11. The method of claim 10, further comprising measuring both loading strain and temperature with the one of the pair of the Bragg grating sensors configured to experience loading strain, and measuring temperature only with the other of the pair of the Bragg grating sensors configured not to experience loading.

12. The method of claim 10, further comprising determining strain amplitude of the polymer composite wireline cable.

13. The method of claim 10, further comprising determining strain amplitude of the polymer composite wireline cable, and converting the strain amplitude into localized vibration frequency.

14. The method of claim 10, further comprising an optical signal processing system comprising a broadband electromagnetic radiation source and signal analysis equipment, and further comprising:
optically interacting light emitted from the broadband electromagnetic radiation source with the pair of Bragg grating sensors, and
receiving the optically interacted light as optically interacted light wavelengths with the signal analysis equipment.

15. The method of claim 14, wherein the signal analysis equipment comprises a computer monitor, and further comprising visually displaying the optically interacted light wavelengths on the computer monitor.

16. The method of claim 14, further comprising converting the optically interacted light wavelengths into an electric signal with the signal analysis equipment.

17. A system comprising:
a wellbore in a subterranean formation;
a polymer composite wireline cable in the wellbore, the polymer composite wireline cable comprising:
a polymeric matrix material,
at least one reinforced fiber embedded in the polymeric matrix material, and
at least one optical fiber disposed in the polymeric matrix material, the at least one optical fiber having at least one pair of Bragg grating sensors, wherein one of the pair of Bragg grating sensors is configured to experience loading strain and the other of the pair of Bragg grating sensors is configured not to experience loading strain, the pair of Bragg grating sensors are located on the same fiber optical cable, and the pair of Bragg grating sensors have the same central resonant wavelength.

18. The system of claim 17, further comprising, an optical signal processing system comprising:
a broadband electromagnetic radiation source that emits light to optically interact with the pair of Bragg grating sensors, and
signal analysis equipment that receives the optically interacted light as optically interacted wavelengths.

19. The system of claim 18, wherein the signal analysis equipment comprises a computer monitor that visually displays the optically interacted light wavelengths on the computer monitor.

20. The system of claim 18, wherein the signal analysis equipment converts the optically interacted light wavelengths into an electric signal.

* * * * *